United States Patent
Hendrick et al.

(10) Patent No.: US 9,922,360 B2
(45) Date of Patent: Mar. 20, 2018

(54) RECOMMENDATIONS SYSTEM

(71) Applicant: HERE GLOBAL B.V., Veldhoven (NL)

(72) Inventors: Daniel Hendrick, Seattle, WA (US);
Damon Lanphear, Seattle, WA (US);
Robert Mahfoud, Seattle, WA (US);
Rodrick Megraw, Seattle, WA (US)

(73) Assignee: HERE Global B.V., Veldhoven (NL)

( * ) Notice: Subject to any disclaimer, the term of this patent is extended or adjusted under 35 U.S.C. 154(b) by 1072 days.

(21) Appl. No.: 13/928,275

(22) Filed: Jun. 26, 2013

(65) Prior Publication Data
US 2013/0346234 A1    Dec. 26, 2013

Related U.S. Application Data (60) Provisional application No. 61/664,738, filed on Jun. 26, 2012.

(51) Int. Cl.
*G06Q 30/00*    (2012.01)
*G06Q 30/06*    (2012.01)
*G06Q 30/02*    (2012.01)

(52) U.S. Cl.
CPC ......... *G06Q 30/0631* (2013.01); *G06Q 30/02* (2013.01); *G06Q 30/0601* (2013.01)

(58) Field of Classification Search
CPC ....... G06Q 30/0601–30/0645; G06Q 30/0254; G06Q 30/0255; H04L 63/02
USPC ................................. 705/26.1–27.2; 726/11
See application file for complete search history.

(56) References Cited

U.S. PATENT DOCUMENTS

| | | | |
|---|---|---|---|
| 7,908,183 B2 * | 3/2011 | Jacobi | G06Q 30/02 705/14.53 |
| 8,015,054 B2 | 9/2011 | Chen | |
| 2008/0243733 A1 | 10/2008 | Black | |
| 2009/0163183 A1 * | 6/2009 | O'Donoghue | G06Q 30/02 455/414.1 |
| 2010/0063969 A1 | 3/2010 | Kasargod et al. | |

(Continued)

OTHER PUBLICATIONS

Jaamour, R. (2005). Securing web services. Information Systems Security, 14(4), 36-44. Retrieved from https://dialog.proquest.com/professional/docview/229545126?accountid=142257.*

(Continued)

Primary Examiner — Resha Desai
Assistant Examiner — Matthew J Kaufmann
(74) Attorney, Agent, or Firm — Ditthavong & Steiner, P.C.

(57) ABSTRACT

A recommendation system communicates with end user devices over a computer communications network and includes a recommendations engine that communicates with the network from behind a firewall that inhibits unauthorized communications from the network, a data file system that receives disposition update data in response to purchase actions initiated by an end user device and receives ingested user activity data in response to activity at a network storefront initiated by an end user device, and a database system that updates a recommendation model for the end user device in response to receiving the disposition update data and ingested user activity data. The recommendations engine generates a recommendation for the end user device in response to the update of the recommendation model.

14 Claims, 6 Drawing Sheets

(56) References Cited

U.S. PATENT DOCUMENTS

| | | | |
|---|---|---|---|
| 2010/0169153 A1 | 7/2010 | Hwacinski et al. | |
| 2010/0191582 A1* | 7/2010 | Dicker | G06Q 30/02 |
| | | | 705/14.51 |
| 2010/0233996 A1* | 9/2010 | Herz | H04L 63/08 |
| | | | 455/411 |
| 2010/0332408 A1 | 12/2010 | Ekhaus et al. | |
| 2011/0153663 A1* | 6/2011 | Koren | G06F 17/30964 |
| | | | 707/776 |
| 2011/0225417 A1* | 9/2011 | Maharajh | G06F 21/10 |
| | | | 713/150 |
| 2012/0143918 A1* | 6/2012 | Hao | H04L 41/5064 |
| | | | 707/791 |
| 2012/0254289 A1* | 10/2012 | Sathish | G06Q 30/0631 |
| | | | 709/203 |
| 2013/0024443 A1* | 1/2013 | Achuthan | G06F 17/30392 |
| | | | 707/722 |
| 2014/0040025 A1* | 2/2014 | Handcock | G06Q 30/0253 |
| | | | 705/14.51 |

OTHER PUBLICATIONS

International Search Report dated Oct. 1, 2013 for International Application No. PCT/US2013/047998, 3 pages.
Notification Concerning Transmittal of International Preliminary Report on Patentability (Chapter I of the Patent Cooperation Treaty); International Preliminary Report on Patentability for corresponding International Application No. PCT/US2013/047998, dated Jan. 8, 2015, 7 pages.

* cited by examiner

RECOMMENDATIONS SYSTEM

CROSS-REFERENCE TO RELATED APPLICATIONS

This application claims priority of U.S. Provisional Patent Application Ser. No. 61/664,738 entitled "Recommendations System" by Daniel Hendrick, Damon Lanphear, Robert Mahfoud, and Rodrick Megraw, filed Jun. 26, 2012. Priority of the filing date of Jun. 26, 2012 is hereby claimed, and the disclosure of the Provisional Patent Application is hereby incorporated by reference.

BACKGROUND

Online transactions are being used more and more for purchases of goods and services. Such online transactions are typically conducted over a computer network such as the Internet, where access is gained either through a computer platform, such as a desktop computer or laptop computer, or through a mobile platform, such as a smart phone that access the Internet through a telecommunication carrier associated with the smart phone or through a "WiFi" connection. Recommendations systems, which are becoming increasingly common in online sales and digital media sites, typically apply information about a user's preferences and purchasing behavior to recommend content, goods, or services in which the user may be interested. Such recommendations systems usually provide a means of content discovery, where the user is presented with relevant content without the user having to explicitly request or look for the content. In this way, goods and services of which the user may have been unaware, may be brought to the attention of the user, for purchase. In addition, the user may be kept abreast of special offers and price reductions of interest. The recommendations systems thereby provide a service to the user and can help increase sales for providers.

In general, the computations and data processing that are typically used to generate recommendations are well-known and well-documented, and are described in publicly available literature. The challenges facing recommendations systems include processing the large volumes of data that are utilized in determining recommendations and ensuring data privacy of users in making the recommendation determinations. In addition, the delivery of recommendation services in the mobile platform context can involve unique challenges, given that network access via a mobile platform such as a smart phone may be limited to a proprietary network associated with the smart phone service provider. Another challenge, in the mobile platform arena, is to provide recommendations that are compatible with an individual destination device and platform. Also, in the mobile context, users may engage in data communications and other activity in multiple networks, both in-network and out-of-network as compared to the network of the user's service provider.

The present invention addresses these concerns for delivery of recommendations to users over a computer network and provides efficient, relevant recommendations in response to activity by multiple users on multiple networks while maintaining privacy and integrity of user data.

SUMMARY

A recommendations system as described herein includes two types of distributed computing systems: online (front-end, also called FE) and offline (backend, also called BE). Both types of systems include respective groups of computers to aggregate storage and compute resources to handle very large volumes of data. A recommendations engine processes data and produces recommendations for users. The large volumes of data being processed comprise the user activity data that informs the recommendations engine and forms the basis for the recommendations themselves. The offline system (BE) is isolated from the public Internet, to protect the security and privacy of the data it stores. The online system (FE) may include multiple components or subsystems that are geographically distributed for efficiency, security, and reliability. In this way, the recommendations system delivers recommendations to users over a computer network and provides efficient, relevant recommendations in response to activity by multiple users on multiple networks, while maintaining privacy and integrity of the user data.

The recommendation system communicates with end user devices over a computer communications network and includes a recommendations engine that communicates with the network from behind a firewall that inhibits unauthorized communications from the network, a data file system that receives disposition update data in response to purchase actions initiated by an end user device and receives ingested user activity data in response to activity at a network storefront initiated by an end user device, and a database system that updates a recommendation model for the end user device in response to receiving the disposition update data and ingested user activity data. The recommendations engine generates a recommendation for the end user device based on the updated model and in response to a recommendation request from the end user device or storefront activity.

If desired, the system can provide recommendations for items that are compatible only with a particular device and platform, so as to accommodate mobile devices that typically have more limited resources. Although the recommendations system is configured to operate efficiently in the mobile platform context, it may also be deployed on more conventional networks that cater to non-mobile or desktop users.

Other features and advantages of the present invention should be apparent from the following description of the preferred embodiments, which illustrate, by way of example, the principles of the invention.

DETAILED DESCRIPTION

Figure 1:
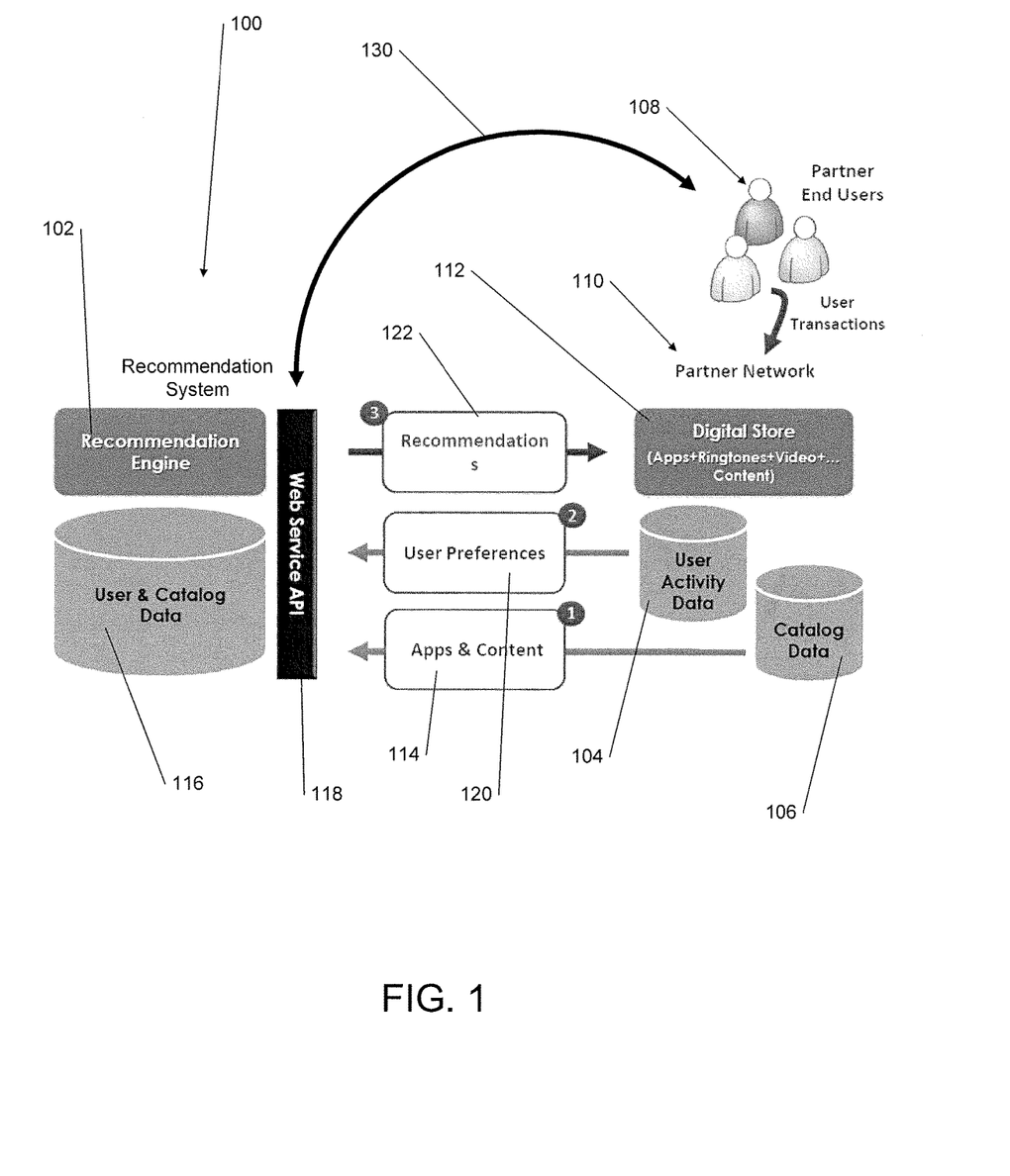
FIG. 1 is a block diagram representation of the recommendations system as described herein.

FIG. 1 shows a block diagram representation of the recommendations system 100 as including a recommendation engine 102 that accesses user activity data 104 and catalog data 106 to provide recommendations to end users. The recommendation engine receives user activity data relating to user activities on mobile devices and receives catalog data relating to items available for purchase by end users. FIG. 1 illustrates that the end users 108 of the mobile devices utilize their devices through subscription to a partner network 110. For example, in the case of smart phones, the partner network is likely the network of the telecommunications carrier who provides the end users with network access. In the U.S.A., for example, such partner networks are provided by carriers such as AT&T, Verizon, Sprint, and T-Mobile. The end users 108 may purchase items from a Digital Store 112 that is accessible to the end users over the partner network 110. The Digital Store may comprise a network virtual storefront of the carrier or may comprise a virtual storefront of a third party, such as the Apple App Store or Android Marketplace, or may be a combination of both. As illustrated in FIG. 1, the Digital Store 112 typically includes items such as applications for the mobile platform, ringtones for the smart phone, video clips, electronic books, and other digital content.

In FIG. 1, the box 114 labeled "Apps & Content" shows that catalog data 106 for applications, content, and other items that are available over the partner network 110 is received from the partner network into data storage 116 of the recommendations system 100 through a Web service API 118. The recommendations system 100 illustrated in FIG. 1 also shows that the user activity data 104, as well as user preferences 118 if any, are also received from the partner network 110 into the recommendations system data storage. The user activity data, including user preferences, are indicated by the box 120 in FIG. 1. The intake of the user activity data 104 and catalog data 106 into the recommendations system 100 occurs through the Web service application program interface (API) 118, the details of which will be known to those skilled in the art. FIG. 1 also shows that recommendations are delivered from the recommendations system 100 to the partner network 110, through the Web service API 118. The recommendations are indicated by the box 122 labeled "Recommendations" in FIG. 1. The recommendations are then delivered by the partner network to the individual end user client devices 108, in accordance with the processing described further below. The double-ended arrow 130 in FIG. 1 indicates that the recommendations system 100 also can ingest user activity data directly from the end user client devices 108, and can return recommendations directly to those client devices, without using any intermediary carrier services 114, 120, 122 or data stores 104, 106. That is, the data flow in and out of the recommendations system 100 under either ingest scenario passes through the Web service API 118.

Figure 2:
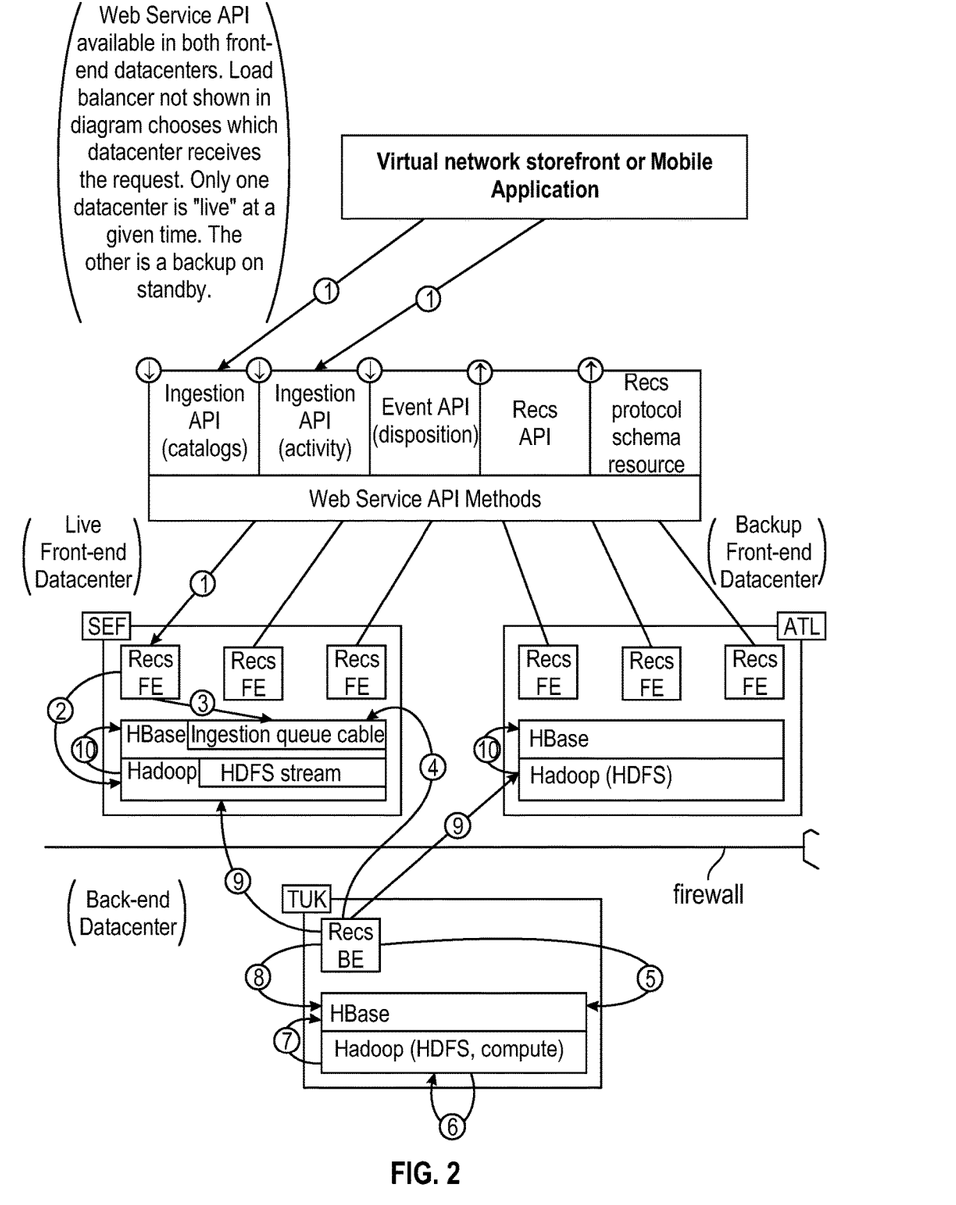
FIG. 2 is a block diagram representation of data flow in the recommendations system of FIG. 1 for the intake of information from end users into the recommendations system.

FIG. 2 shows data flow in the recommendations system 100 of FIG. 1 for the intake of user activity information from end users into the recommendations system. The "Storefront or Mobile Application" block at the top of FIG. 2 represents either a network virtual storefront through which users may purchase items, or a mobile application on the end user device that directly interacts with the recommendations system. For easier description, this block will be referred to simply as the "Storefront" block. FIG. 2 shows multiple API entry points through which the various data exchanges may occur between the Storefront block, which is accessed by users at their mobile devices, and front end processing components of the recommendations system, which comprise the blocks labeled "SEF" and "ATL" in FIG. 2. For example, at the Storefront block, an end user calls for item-based recommendations from an item-based API on item detail pages, or the end user calls for user-based recommendations from a user-based API on the Storefront home page, and posts user activity data to the recommendations engine through an analytics service.

The Storefront block can comprise online storefronts, also called store portals, that support user shopping, or the Storefront block can comprise mobile applications through which users engage in shopping. In a typical operation scenario, a storefront submits a catalog, as well as user activity data collected by the storefront. A mobile application typically submits user activity of the user at the mobile device on which the application is installed. It should be noted that a mobile application would not typically submit a catalog, in contrast to the storefront. Nevertheless, when a mobile application submits activity data, it does so in response to a user action or a group of user actions. The end users themselves typically are not choosing when and what user activity data is sent. Rather, the developer of the mobile application determines when and what user activity data will be submitted to the recommendations system. There is usually an agreed-upon specification between the recommendations system and the storefront and/or the mobile applications developer with respect to what user activity data will be sent, when it will be sent, and how it will be formatted. Thus, the operations indicated by "1" in FIG. 2 relate to the data flows 114 and 120 illustrated in FIG. 1, as well as the direct data flow 130 in FIG. 1, where the end user's mobile application submits user preferences data directly to the recommendations system via the API.

The recommendations system components SEF and ATL comprise an online processing aspect (also referred to as the "front end" or FE) of the data flow into the recommendations system. The user activity information is shown in FIG. 2 being uploaded to the ATL component at the arrow marked "1" in FIG. 2. That is, the operation "1" indicates catalog data or user activity data being uploaded to the FE of the recommendations system. Operation "2" indicates data being written by the recommendation system FE into the Hadoop data file system (HDFS). Operation "3" indicates updating an ingestion queue table. The operation "4" indicates periodic polling of the ingestion queue table by the recommendation system BE. Operation "5" indicates copying of ingested data to the HDFS. Operation "6" indicates ETL transformation processing of the ingested data. Operation "7" indicates reading ingested data, rebuilding recommendation models, and writing to HBase tables or to the HDFS. The operation "8" indicates exporting the HBase tables into the HDFS. The operation "9" indicates copying from the HDFS to FE Hadoop clusters in both of the two data centers. Operation "10" indicates importing from the HDFS to the HBase tables in both of the data centers, which completes the updating of the recommendation model.

The user activity information is later received into the back end recommendations system components, labeled "TUK" in FIG. 2, which comprises an offline aspect (also referred to as the "back end" or BE) of the data flow. The online components are separated from the offline components by a firewall, represented in FIG. 2 by a horizontal line across the drawing. That is, the intake of user activity data and catalog data at the back end is separated from the collection at the front end by the firewall. The firewall ensures data privacy and security for the recommendations processing.

Thus, the combination of the blocks SEF, ATL, and TUK in FIG. 2 correspond to the recommendations system 100 illustrated in FIG. 1. The storefront block in FIG. 2 corresponds to the partner network 110 illustrated in FIG. 1. That is, the blocks SEF and ATL are redundant instances of "front end" services that accept connections from storefronts and mobile applications. Typically, only one of the SEF and ATL blocks is active at a given time, and the other block is idle with respect to processing activities, serving as a backup. These front end services collect data from the storefront and mobile applications, to stage the collected data and prepare it for permanent or extended data storage, and to host recommendations models that, though the Web server API, provide recommendations in response to recommendations requests. TUK is a "back end" service that is not reachable by the "front end" services, mobile applications, or storefronts. The "back end" service connects to the "front end" services and retrieves data from them, and keeps it in long-term storage. The "back end" service also performs computations on the data to build recommendations models, and copies these models to the "front end" services.

In FIG. 2, the ingestion queue table stores references to data that has been ingested (data comprising catalog data or user activity data, or both). For example, when a new catalog file is ingested through the Web service API, it is stored on the file system of the recommendation system, and an entry is made in the ingestion queue table that contains the path to where the file is stored. The ingestion queue table represents a first-in, first-out ("FIFO") queue. In the FIG. 2 operation identified with "4", the back end is polling to determine if there are any new entries in the ingestion queue that have been added since the time of the previous polling. If there are any new entries, the back end (BE) removes them from the ingestion queue in FIFO order, and copies the referenced files from the FE to the BE. When all the entries have been copied, the file is deleted from the FE. That is, the FE cannot initiate copying to the BE.

The data flow labeled "5" in FIG. 2 represents the process storing the ingested catalog data and user activity data to the back end (BE) components, such as an HDFS block.

After the data flow "5" ingestion to the back end HDFS, at the data flow labeled "6", a process performs ETL transformations on catalogs and user activity data to transform such data from its raw formats into the formats required by the BE for processing. For example, the BE processing engine processes catalog data according to a predetermined format that includes specific data fields in the records comprising the catalog data, and the BE may drop data fields from the catalog data that are not needed. Likewise, the BE processing engine processes user activity data according to a predetermined format that includes specific data fields in the records comprising user activity data, and the BE may drop data fields from the user activity data that are not needed. After ETL processing, the resulting data is used in computations that build recommendations models. A recommendations model is basically a table of coefficients that are re-computed periodically when there is new user activity data or new catalog data available. The coefficients may change each time the recommendation model is re-computed, reflecting changes in the data. The table of coefficients (i.e., the recommendation model) is copied to the FE service. When the FE service receives a recommendations request, it applies the appropriate model coefficients to the data in the request to produce the optimal recommendations response.

There are multiple types of HBase tables in the recommendation system. Entries in the HBase tables depend on the type of data the table represents. For catalogs, HBase tables have one row per catalog item, and table columns are for the fields of catalog data to be processed for a purchase (e.g. title, price, download URL, and so forth). For recommendation models, the HBase tables contain rows with catalog item ID's and weights. The rows are indexed by lookup keys that may contain filtering information, such as item type (ringtone, game, etc), item category (e.g. arcade game, or productivity app), and compatible device ID (e.g Samsung-123). The table structure of the models allows the FE service to quickly look up candidate recommended items that it may use to fulfill a recommendations request. The FE uses the weights associated with the item IDs to determine the relevance of the items, and to perform weighted sampling on the items. The data flows indicated by the labels "7" and "8" in FIG. 2 relate to updating the HBase table and exporting it to a file that can be copied to the FE HDFS. Systems other than HDFS may be used in the recommendations system steps 7 and 8, but those skilled in the art will appreciate that the Hadoop file system is well-suited to the type of operations performed by the recommendations system. The data flow "7" in particular represents writing from the HDFS tables to the HBase.

The main task performed by the data flows indicated by operations 7, 8, 9, and 10 is that of computing the model coefficients, storing them in tabular form, and exporting and copying the resulting table from the BE HBase to the FE HBase. A distributed file system is used, because the volume of data being processed is extremely large, and would not fit on a conventional file system. HDFS is the distributed file system used because it provides many convenient features, such as redundancy and fault tolerance, as well as integration with the Hadoop distributed processing framework. The data flow "9" represents copying from the BE to the FE.

Figure 3:
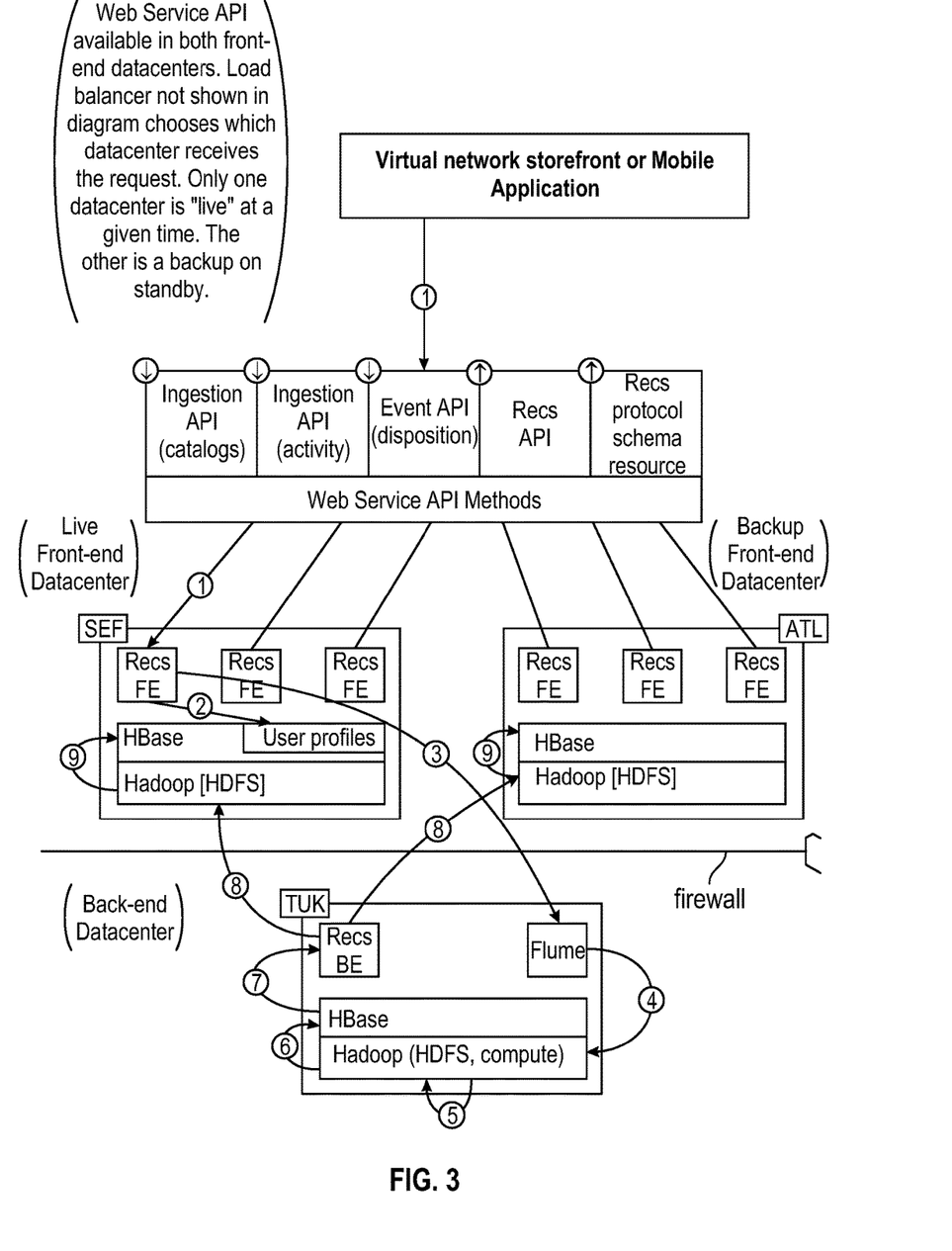
FIG. 3 is a block diagram representation of data flow in the recommendations system of FIG. 1 for the intake of catalog information and other data for populating the items that are subject to being recommended.

FIG. 3 shows data flow in the recommendations system of FIG. 1 for the intake of catalog information and other data, for populating the items that are subject to being recommended. The components illustrated in FIG. 3 are the same as those illustrated in FIG. 2, so the Store Front block at the top of FIG. 3 represents a network virtual store front through which users may purchase items, SEF and ATL represent front end processing components of the recommendations system. That is, SEF and ATL are redundant instances of data centers hosting FE service instances. That is, "SEF" refers to the abbreviated name of a data center, and "ATL" refers to the abbreviated name of another data center. The recommendations system component TUK represents back end processing components of the recommendations system.

In FIG. 3, the first operation (labeled with "1") is a disposition event, which is user activity data from a storefront or a mobile application that indicates a particular user's preference towards one or more catalog items. For example, if a user installs a mobile application, that application installation may be sent as a disposition event. The installation would be interpreted as the user showing a positive interest in the application.

The second operation "2" in FIG. 3 indicates processing an incoming disposition for real-time update of a user profile. That is, "2" represents a real-time data transfer operation. The operation "3" indicates flume transport of disposition profile updates to the BE data center. Operation "4" indicates writing a disposition update to the BE data center. Operation "5" indicates an ETL transformation of the data. Operation "6" indicates reading ingested data, rebuilding recommendation models, and writing to HBase tables or to the HDFS. The operation "7" indicates exporting the HBase tables into the HDFS. The operation "8" indicates copying from the HDFS to FE Hadoop clusters in both of the two data centers. Operation "9" indicates importing from the HDFS to the HBase tables in both of the data centers, which completes the updating of the recommendation model.

In the operation "3", the processing involves collecting multiple disposition events into a batch of events (such as a data file), and copying the batch of events to the BE. The flume transport is a data service that provides the transport of the events from the FE to the BE. The rebuilding in operation "5" involves the BE utilizing algorithms that use large volumes of user activity data and catalog data to compute the recommendations models. A recommendations model is a table of coefficients representing catalog item IDs and weights, which are used by the FE's to fulfill recommendations requests.

For operation of the recommendations system, a software agent on each mobile computing device that will receive recommendations is configured to operate so that it records data concerning the user's activities on the mobile device as the activities occur. The data relating to these user activities is either uploaded to the recommendation engine in real-time via a network protocol such as HTTP, or they are collected by an external system and transmitted in bulk to the online portion of the recommendations system on a regular basis. The user activity data is then transmitted to the offline portion of the recommendations system for further processing. Thus, the information ingestion or collection into the recommendations system occurs through the front end, for the online processing, and through the back end, for the offline processing.

All models are pre-computed in the offline system and delivered to the user in response to a user activity or request for a recommendation. In this context, reference to a "model" refers to the output of the machine learning models. The machine learning models (i.e., algorithms) are used to generate computer recommendations models (tables of coefficients). The recommendations models indicate popularity of catalog items, and indicate associations between catalog items. The model is represented in tabular form, containing catalog item IDs and weights to indicate associations. Inputs to the models include filtering parameters (item type, category, and device ID), contextual parameters (what item is the user looking at now), and historical information (what are the user's preferences as measured from past activity data). The offline pre-computing is performed to ensure very fast response times when the online system processes a request for a recommendation. That is, recommendations are not computed on-the-fly at the time of a user request. Rather, recommendations are computed online given the models and inputs to the models, such as past user activity, device type, and the like, which have been pre-computed. Thus, the "SEF" and "ATL" and "TUK" data centers in FIG. 3 correspond to components of the system 100 in FIG. 1. That is, FIG. 1 shows the block 100 representing SEF, ATL, and TUK all together as a single system. The recommendations may, however, be augmented at response time in the presence of new user activity data submitted during the current user session that may not have been taken into account in the pre-computation of the recommendations.

The items to be identified in the recommendations to be produced may be selected from among the items in one or more catalogs of items. For example, a vendor or storefront merchant who wants to use the recommendations system described herein may have particular goods or services to be provided, which will be selected for recommendation using the recommendations system. As with the collection of user information, the catalog ingestion or collection process from the catalog data in the partner network into the recommendations system occurs through the front end, for the online processing, and through the back end, for the offline processing. It should be noted that FE catalog ingestion is different from BE catalog ingestion primarily in that the location into which the ingestion is received differs (e.g., TUK for BE, SEF and ATL for FE). Ultimately, the ingested data become part of the catalog data (116 in FIG. 1) that is shared between TUK, SEF, and ATL. That is, catalog ingestion to FE is to collect catalog data from the storefronts, whereas catalog ingestion to BE is to move the catalog from the FE to the BE, where it will be used in building recommendations models.

Once the models have been pre-computed they are then staged for delivery in the online system. The recommendations are staged in a specialized distributed database that can be scaled to store personalized recommendations for 100's of millions of users. The online system receives requests for recommendations via HTTP and processes, which contain information on the user's device, identity, and list of items the user is currently viewing. The online system uses the information submitted in the request to look up a set of recommendations. Some post-processing is performed to ensure that current user activity is taken into account, that the recommendations are diverse, and the same recommendations are not displayed to the user on multiple requests.

Outline of the Recommendations Platform

The recommendations system illustrated in FIG. 1 produces its recommendations through a recommendations platform that provides for data collection, model building, and a recommendations API.

I. Customer Configuration

A new customer can be configured for the system using the shared infrastructure. In the disclosed recommendations system, it is useful to consider the distinction between a system that only supports a single customer and a system that requires additional infrastructure to support new customers. The recommendation system supports the configuration of "organizations", where an organization corresponds to a collection of catalogs, user activity data, and models computed from the catalog and user activity data. An organization is an abstraction that represents a business entity that operates one or more storefronts or mobile applications that will interact with the recommendations system. A realistic example is that ringtones and applications may be handled by different storefronts, but these storefront are operated by a single business entity and serve the same base of customers. The system supports configuration of multiple organizations. The recommendation system scales to support an arbitrary number of organizations by simply adding storage capacity (e.g., Hadoop and HBase nodes) and FE service capacity. Configuring a new customer involves: configuring ingestion of the catalogs for the organization (what they are, where they are stored, how are they parsed), configuring ingestion of the user activity data (what the sources are, where it's stored, how it's parsed), and configuring a Web service API provider for the organization (the API methods available to the organization, the storefronts, and mobile applications that are supported). Each organization is also configured with "channels" which roughly correspond to the storefront and mobile applications that call for recommendations. For example, an organization might support two storefronts, each with its own channel. A channel configuration defines what mix of catalogs are available to be recommended. While an organization may support several catalogs over all, each channel may only be configured to support a subset of the catalogs.

II. Data Collection

Data collection is performed on two main types of data for intake: item catalogs, and user activity data. The item catalogs typically comprise files containing lists of items and metadata. There is usually one received data file per item type. Item types may comprise, for example, mobile applications, or ringtones, or movies, and so forth. The illustrated system supports file formats including MFS and Atom, but additional or different file formats may be supported, as desired. The user activity data from the mobile device typically includes log files of user clicks, online purchases, and the like. The received data will typically provide a text or alphanumeric data file with one line per user action. The illustrated system supports file formats including tab-separated values (TSV) and comma-separated values (CSV), but additional or different file formats may be supported, as desired.

A. Item Catalogs

The item catalogs are received in batch upload via the well-known HTTP PUT method. Each item in a catalog must be associated with a unique identification string (item ID). Other item metadata in the item catalogs is optional, but if present is retained and passed through in the recommendation engine storage. The item catalogs are updated as needed, and generally, the most recent catalogs available are used to be certain that recommendations are for currently available items. Such updating is dependent on cooperation with the network partners. A historical view is kept to recognize user activity on past items. The historical view comprises a catalog of all items that have ever passed through (i.e., been ingested by) the recommendations system. More particularly, the historical view is a catalog that stores the item ID and last known metadata for each item specified by an item ID. The historical view catalog is updated each time a new item catalog is processed. The purpose of the historical view catalog is to identify items that appear in user activity data that are no longer available in the most current item catalog. The ability to identify items in past user activity that are no longer available can be helpful in coming up with current recommendations. This ability is useful for the purpose of characterizing user preferences. Even if some items are no longer available, user actions on these items may indicate certain preferences that can be mapped to items that are currently available. User profiles typically include user activities such as item views, item clicks, and item purchases. Items can be annotated with additional metadata tags, if provided, at the time of intake.

B. User Activity Data

The user activity data is received in batch intake operations via the well-known HTTP POST tag. Real-time activity data is received via an Event API, directly updating user profiles. In the recommendations system, user profiles include an aggregated summary of each user's activity over a period of time. The period of time will depend on the system resources, such as storage space, and could comprise, for example, a period of one year, or multiple years of history. A user profile includes information indicating what actions the user has made (such as item views, item clicks, or item purchases), when the actions were made, what items were acted on, and numeric scores indicating the strength of the actions with respect to the user's interest in the items acted on. The activity data may include, for example, user actions to install items such as applications. For example, installing a downloaded application has a greater strength of action as compared to clicking on a link for an application and reading information about the application. The pre-computed models are used in the online recommendations processing. That is, the models are used to compute a set of recommendations to fulfill a request. Each user activity or action must be associated with a user ID and an item ID. All user activity data is kept indefinitely, subject to data storage resources. More particularly, user activity data in unaggregated (raw) form is kept indefinitely. User profiles are built from the unaggregated user activity data from a specific period of time. That is, user activity data in profile is a subset of total user activity data stored elsewhere.

III. Model Building

The system supports building two types of models: associations models and popularity models. These models are used in the recommendations processing, described further below. The associations models include item-to-item associations, which are represented in general terms as: $src1 \rightarrow (tgt1,w1), (tgt2,w2), \ldots$, meaning that a Source 1 is associated with an n-tuple comprising items (Target 1, Weight 1), (Target 2, Weight 2), and so forth, where the weighting is a value assigned to each respective target. The popularity models comprise a ranking of the most popular items, such as the top "N" most popular items, and are represented in general terms as: $(item1,w1), (item2,w2), \ldots$, meaning that the items are represented in a data file as multiple pairs of items and their respective popularity rankings or weights. The two types of models are used in the online recommendations processing. That is, they are used to compute a set of recommendations to fulfill a request.

The association models and popularity models are stored in de-normalized form with compatible targets pre-computed for each permutation of device type, category, and device filter. Tunable thresholds are used on item counts and scores. The recommendations system performs tunable score adjustments on a per-item or per-category basis. For example, a particular item may be "boosted" or increased in results ranking, or a particular item may be banned altogether and will be excluded from recommendations, depending on adjustments, which may be implemented in accordance with registered user preferences or partner preferences. That is, user preferences and partner preferences may be received by the recommendations system for purposes of implementing score adjustments when the models are used for generating recommendations.

A. Association Models

One of the association models may comprise metadata associations that are based only on item metadata from an item catalog. User profiles, another association model, form the basis for activity associations and user-based recommendations. Activity associations are based on collective actions of users on items. For a metadata association, for example, an arcade game may recommend other arcade games, and is usually used only when there is no activity data (i.e. from a "cold start"). Such recommendations, however, often require good item metadata, but nevertheless may not be especially interesting to end users. In addition, they can be relatively slow to compute for a large catalog. User profiles capture user ratings (possibly implicit ratings) of items. The user profiles are usually built as the first step to calculating activity associations and are represented as: $user1 \rightarrow ((item1, w1), (item2,w2) \ldots$, for each user. The user profiles are generally computed from user activity data over a configurable window of time (e.g. last 365 days) and are used to compute user-based recommendations for users when specific source items are not provided. Lastly, activity associations may be used. Such associations typically utilize a collaborative filtering approach, where item associations are scored and ranked according to a configurable distance metric, such as L2. Associations are typically used when there is sufficient user activity data to provide reliable recommendations, and can produce more interesting and cross-type recommendations as compared with other associations. For example, a situation in which an action game recommends a heavy metal ringtone. Such associations, however, generally need a good quality signal for user interests, and not all item associations are intuitive, making processing more difficult to set up.

B. Popularity Models

There are two types of popularity models, metadata popularity and activity popularity. The metadata popularity is based only on item metadata from a catalog, and can be computed from a combination of item attributes such as download count, or item rating. The activity popularity is based on collective actions of users on items, and may be computed from user activity data over a configurable window of time (e.g. last 90 days).

C. Model Updates and Export

Models are rebuilt regularly with updated catalog and activity data. The metadata associations and popularity models are rebuilt when a new catalog is ingested. The activity associations and popularity models are rebuilt on a configurable period (e.g. daily) with most recent user activity data. The models and user profiles are exported from the back-end cluster component (such as TUK in FIG. 3) to front-end clusters where they are "live" (such as SEF and ATL in FIG. 3).

IV. Recommendations API

There are two methods supported through the recommendations API, as illustrated in FIGS. 2 and 3 via HTTP GET: item-based recommendation methods and user-based recommendations (for personalized recommendations). The recommendations queries received from network partners may comprise query parameters such as: max, for the maximum number of items to returned; type, for a filter according to the item; category, for a category filter; device, for a filter according to device; and channel, for an alphanumeric string that identifies the calling application.

Some of the models and features that are available through the recommendations system API include the following:

Fallback model: A meta-model that calls other models, falling back to a less-relevant model if a more relevant model is not available or does not return a result. For example, is a result from an associations model is not returned, the fallback model would attempt to return a result from a popularity model. Goal is to return the most relevant result possible for any given request.

AB Test model: A meta-model that calls other models for the purpose of evaluating the effectiveness of the models in a AB test (i.e., a multivariate test). For example, an AB test model could be configured with 2 different versions of associations models, m1 and m2. When the AB test model is called, it would randomly choose whether to call m1 or m2, and would record which model was used in a log file, so the results of the test could be analyzed.

Item-based recommendations: A method in the recommendations API that accepts a list of item ID's as inputs and attempts to return recommendations based on these source items.

User-based recommendations: A method in the recommendations API that accepts a user ID as input and attempts to return recommendations based on the user's profile (i.e. past activity).

Device filtering: An optional parameter in the recommendations API that allows system partners to specify a device ID or user agent. In this context, "system partners" refers to storefronts or mobile applications that request recommendations to display to the user.

If device filtering is specified, then the recommendations returned will be recommended for the specific device, and will be guaranteed to be compatible with the specific device. The recommendations models are built with internal knowledge of devices and their features, and ensure that recommendations are available for all known devices. This is a unique capability among conventional commercial recommendations systems. For example, if the device specified in the request is a Samsung "XYZ" device, then the recommended items will be compatible with the Samsung "XYZ" device. Other recommendations systems may return some items that are incompatible with the user's device, or may not return anything at all.

Item-type filtering: An optional parameter in the recommendations API that allows system partners to specify which type of items to recommend. A "system partners" refers to storefronts or mobile applications that request recommendations to display to the user. For example, the recommendations system may be configured to recommend games and ringtones, but a system partner may specify that it wants only recommendations for games.

Category filtering: An optional parameter in the recommendations API that allows system partners to specify which category of items to recommend. Category filtering is only valid if a type filter is also specified. For example, a system partner may specify in the request that it wants recommendations for sports games, or recommendations for jazz ringtones, each of which specifies a "type" (sports games or jazz ringtones) to be implemented in a category filter.

IV. Result Formats

Figure 4:
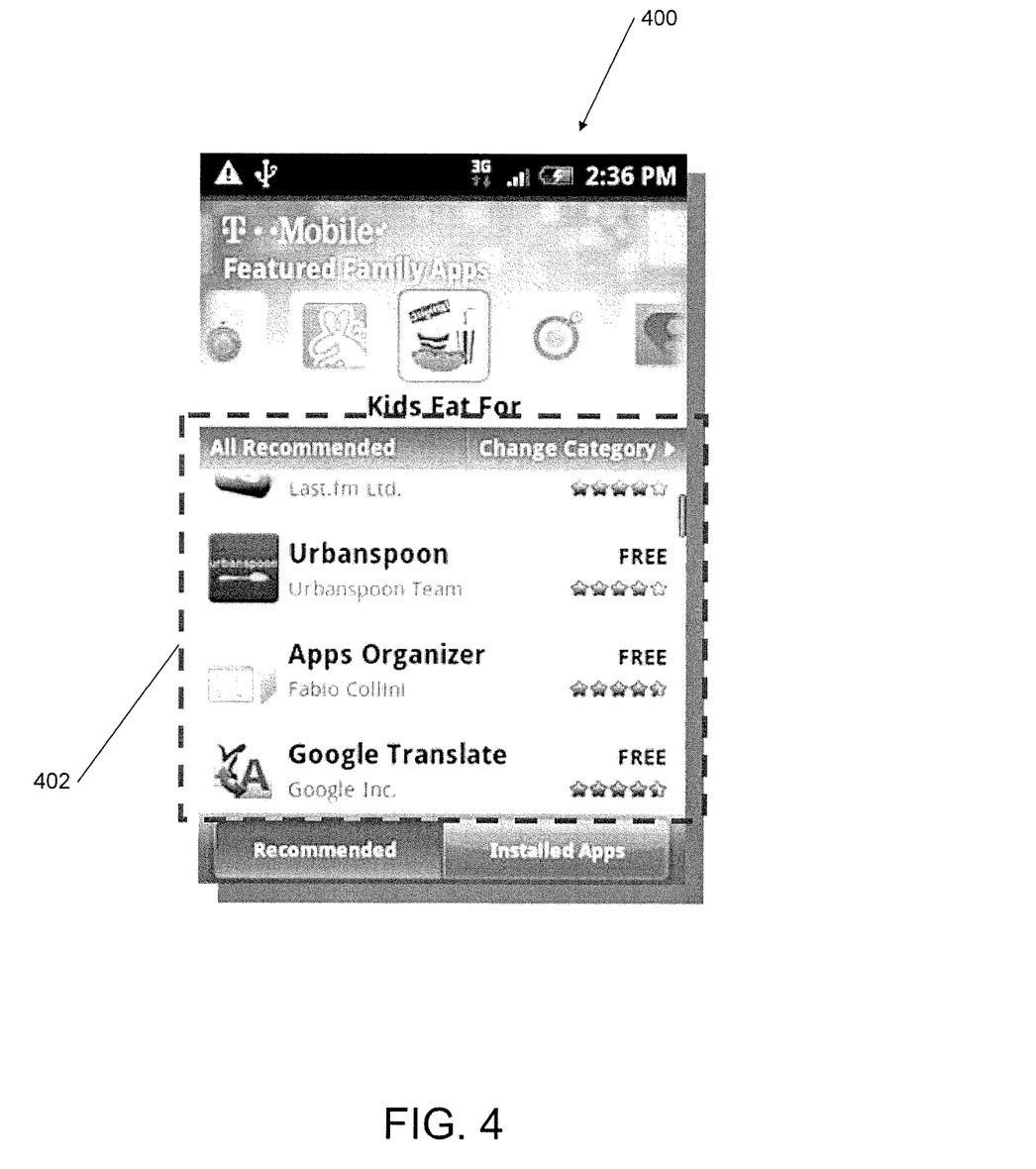
FIG. 4 is a screen shot of a mobile device display that shows recommendations delivered to an end user.

FIG. 4 shows a screenshot of a recommendations result, provided in a display format that is generated for the user device for which the recommendations were requested. In the FIG. 4 display, the user device is a smartphone. The FIG. 4 smartphone display screen 400 shows that the user device is communicating via a 3G network. In this case, the service provider shown on the display screen 400 is the T-Mobile network. The dashed line 402 in the display screenshot indicates the recommendations results that were returned to the user.

An XML format of the recommendations result may be provided by the following example XML code:

```
<ma:recommendations xmlns:xs="http://www.w3.org/2001/XMLSchema"
xmlns:ma="http://schemas.medio.com/analytics/1.0">
<responseTime>3</responseTime>
<requestId>MRECS-8de8cbd5-5727-47c1-bd0f-c44e05dbfaf6</requestId>
<modelName>android:apppackStaticPopularity</modelName>
<ma:recommendation>
<id>com.google.android.apps.maps</id>
<type>APP</type>
<name>Google Maps</name>
<description>
New features: * See ratings for aspects about a place such as service or
atmosphere * Transit station pages show next departures * Latitude
suggests friends Also includes: * Navigation (Beta) * Search by voice *
My Location * Business listings * Directions * Traffic * Layers * Street
View * Latitude * Google Buzz
</description>
<publisher>Google Inc.</publisher>
<category>TRAVEL</category>
<updated>20100622090404.000 -0700</updated>
<rating>4.6064253</rating>
<price>0</price>
<currency>micro-USD</currency>
<iconURI>-3632499760052616472</iconURI>
<downloadURI>market://details?id=com.google.android.apps.maps
</downloadURI>
```

-continued

```
<ma:extensions>
<ma:extension ma:key="platform">
<ma:value>4</ma:value>
</ma:extension>
<ma:extension ma:key="model">
<ma:value>apppackStaticPopularity</ma:value>
</ma:extension>
<ma:extension ma:key="type">
<ma:value>android</ma:value>
</ma:extension>
</ma:extensions>
<ratingCount>233648</ratingCount>
<downloadCount>10704307</downloadCount>
</ma:recommendation>
<ma:recommendation>
<id>com.facebook.katana</id>
<type>APP</type>
<name>Facebook for Android</name>
<description>
```

Facebook for Android makes it easy to stay connected and share information with friends. You can share status updates from your home screen, check out your News Feed, look at your friends' walls and user info, upload photos, share links and check your Inbox.

```
</description>
<publisher>Facebook</publisher>
<category>SOCIAL</category>
<updated>20100423113356.000 -0700</updated>
<rating>3.3047643</rating>
<price>0</price>
<currency>micro-USD</currency>
<iconURI>-4866929442802822794</iconURI>
<downloadURI>market://details?id=com.facebook.katana</downloadURI>
<ma:extensions>
<ma:extension ma:key="platform">
<ma:value>3</ma:value>
</ma:extension>
<ma:extension ma:key="model">
<ma:value>apppackStaticPopularity</ma:value>
</ma:extension>
<ma:extension ma:key="type">
<ma:value>android</ma:value>
</ma:extension>
</ma:extensions>
<ratingCount>115276</ratingCount>
<downloadCount>6379078</downloadCount>
</ma:recommendation>
</ma:recommendations>
```

Recommendation results can also be returned in Protocol Buffers binary format or JSON format. In FIG. 4, the screenshot 400 shows a client application that has formatted and displayed the recommendations results in a graphical user interface. Note the raw recommendations results include all item metadata necessary to display the items in a rich graphical user interface. This makes it possible for client applications to directly call and display recommendations results, rather than having to look up additional data elsewhere.

Exemplary Hardware System

The systems and methods described above may be implemented in a number of ways. One such implementation includes computer devices having various electronic components. For example, components of the system in FIG. 1 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 5:
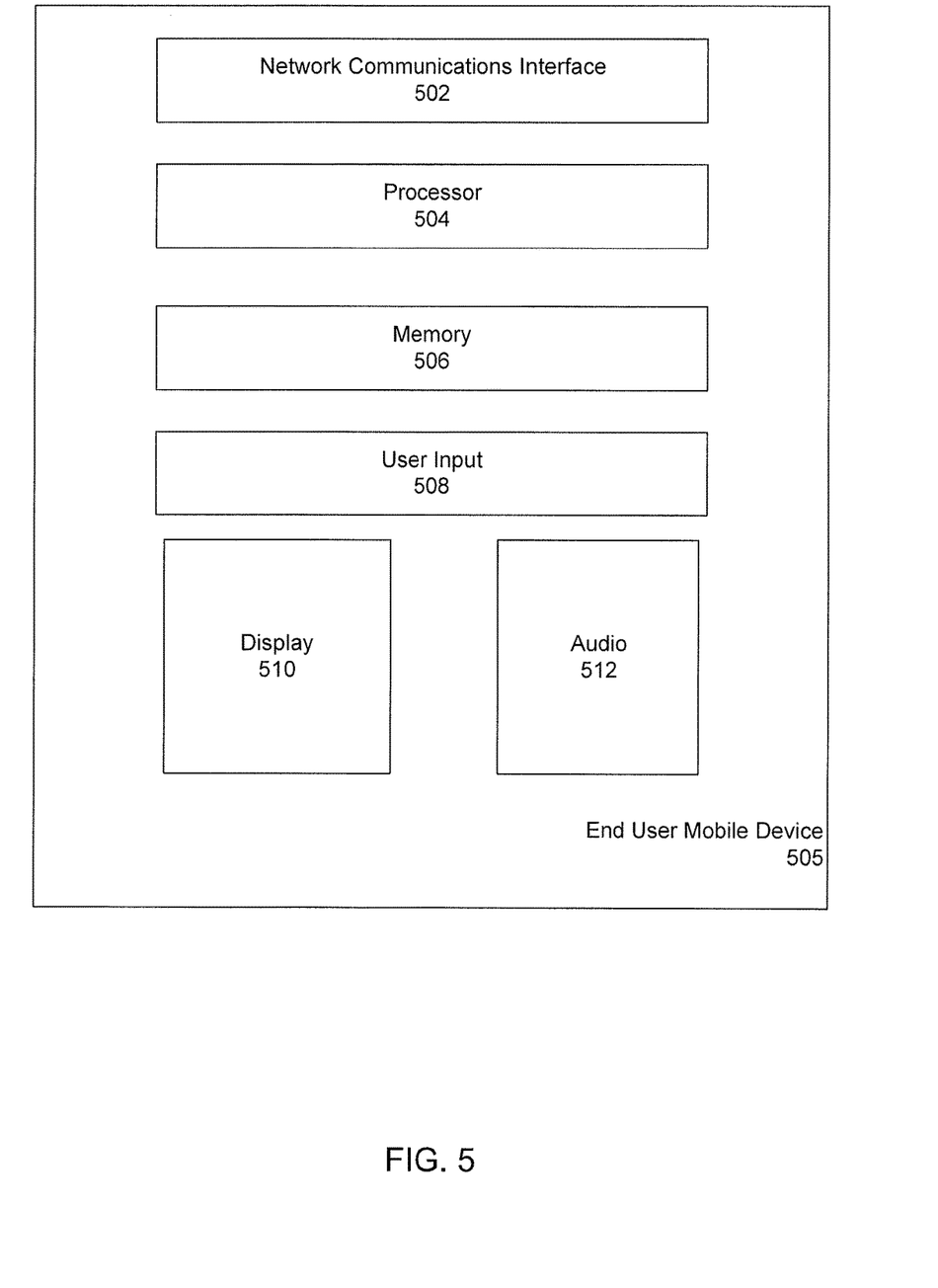
FIG. 5 is a block diagram of an end user mobile device such as used by an end user of the recommendations system.

FIG. 5 is a block diagram of a mobile device 500 such as one of the end user devices 108 illustrated in FIG. 1. The mobile device 500 includes a network communications interface 502 through which the mobile device communicates with the partner network 110 or directly with the recommendations system 100 (FIG. 1). A processor 504 controls operations of the mobile device. The processor comprises computer processing circuitry and is typically implemented as one or more integrated circuit chips and associated components. The mobile device includes a memory 506, into which user activity, installed applications, and personal data can be stored. A user input component 508 is the mechanism through which a user can provide controls, responses, and data. The user input component can comprise, for example, a keyboard or numeric pad, voice microphone, touch-sensitive display, or other input mechanism for providing user control and data input. A display 510 provides visual (graphic) output display and an audio component 512 provides audible output for the mobile device.

Figure 6:
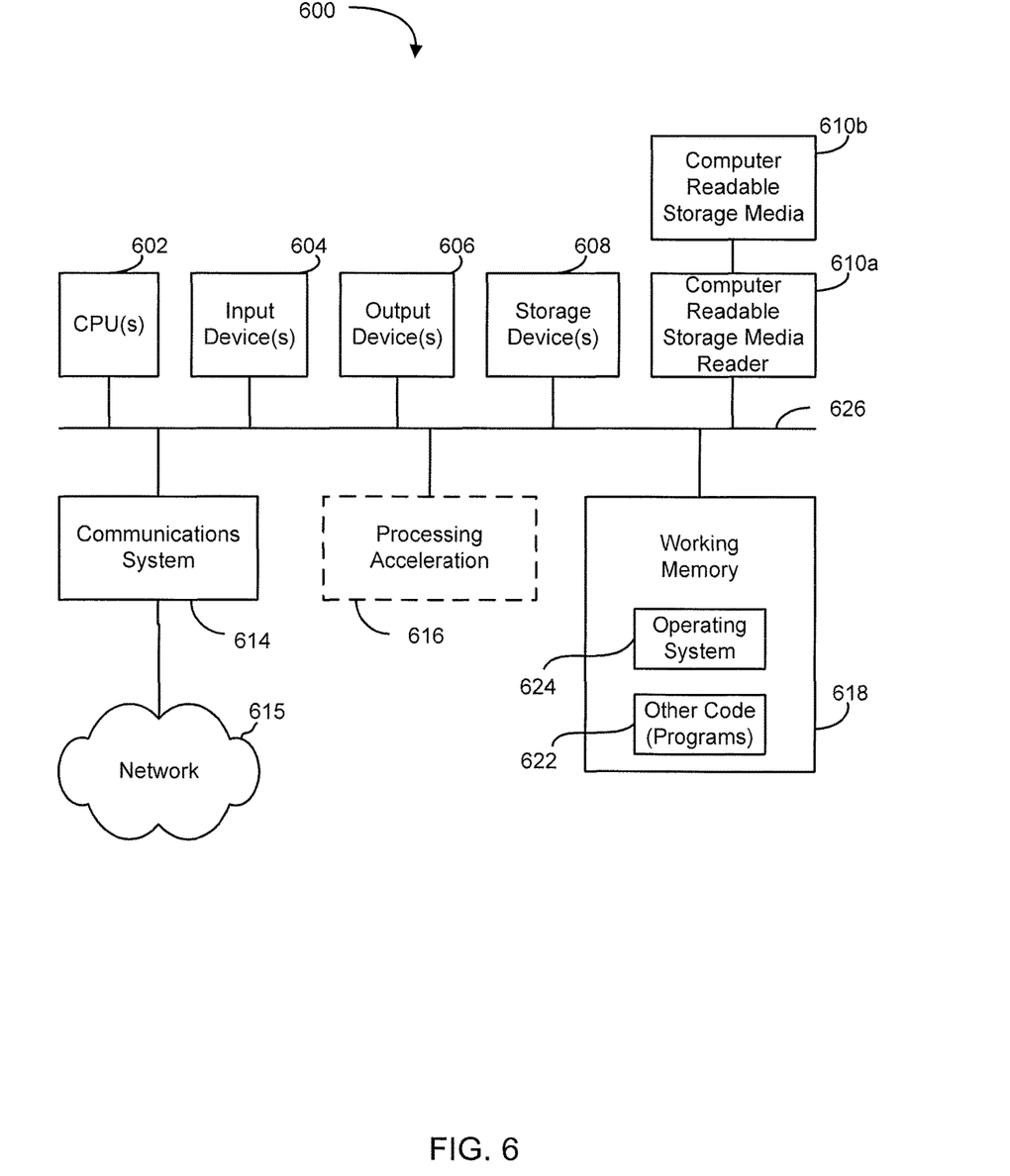
FIG. 6 is a schematic diagram representation of a computer system for implementing functions and operations as described herein.

FIG. 6 provides a block diagram of a computer system 600 for implementing certain functions and operations as described herein. In one embodiment, the system 600 may function as the recommendations system 100 shown in FIG. 1 or a partner network computer 110, or one of the front-end or back-end computers illustrated in FIG. 2 and FIG. 3. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computational system 600 is shown comprising hardware elements that can be electrically coupled via a system bus 626 (or may otherwise be in communication, as appropriate). The hardware elements can include one or more central processor units (CPUs) 602, including without limitation one or more general-purpose processors and/or one or more special-purpose processors (such as communication processing chips, graphics acceleration chips, and/or the like); one or more input devices 604, that can include, without limitation, a mouse, a keyboard, and/or the like; and one or more output devices 606, which can include without limitation a display device, a printer, audio device, and/or the like.

The computational system 600 may further include (and/or be in communication with) one or more storage devices 608, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computational system 600 might also include a communications subsystem 614, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 614 may permit data to be exchanged with a network 615, and/or any other devices described herein. The network 615 may comprise a local area network (LAN) or a network such as the Internet, or a combination. In many embodiments, the computational system 600 will further include a working memory 618, which can include a RAM or ROM device, as described above. The system may optionally include processing acceleration 616 to assist with processing, such as arithmetic computations, graphical computations, and the like.

The computational system 600 also may comprise software elements, shown as being currently located within the working memory 618, including an operating system 624 and/or other code, such as one or more application programs 622, which may comprise computer programs performing tasks and operations described above, and/or may be designed to implement methods in accordance with the invention and/or configure systems in accordance with the invention, as described herein. Merely by way of example, one or more procedures described with respect to the method(s) discussed above might be implemented as code and/or instructions executable by a computer (and/or a processor within a computer). In one embodiment, the data generating and presenting operations are implemented as application programs 622. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 610*b*. In some embodiments, the computer readable storage medium 610*b* may comprise the storage device(s) 608 described above. In other embodiments, the computer readable storage medium 610*b* might be incorporated within the computer system. In still other embodiments, the computer readable storage medium 610*b* might be separate from the computer system (i.e., it may be a removable readable medium, such as a compact disc, etc.), and or might be provided in an installation package, such that the storage medium can be used to program a general purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.), then takes the form of executable code. In these embodiments, the computer readable storage medium 610*b* may be read by a computer readable storage media reader 610*a*.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one embodiment, the invention employs local and remote computer systems (such as the computational system 600) to perform methods of the invention. According to a set of embodiments, some or all of the procedures of such methods are performed by the computational system 600 in response to the processor 602 executing one or more sequences of one or more instructions (which might be incorporated into the operating system 624 and/or other code, such as an application program 622) contained in the working memory 618. Such instructions may be read into the working memory 618 from another machine-readable medium, such as one or more of the storage device(s) 608 (or 610). Merely by way of example, execution of the sequences of instructions contained in the working memory 618 might cause the processor(s) 602 to perform one or more procedures of the methods described herein.

The terms "machine readable medium" and "computer readable medium," as used herein, refer to any medium that participates in providing data that causes a machine to operate in a specific fashion. In an embodiment implemented using the computational system 600, various machine-readable media might be involved in providing instructions/code to processor(s) 602 for execution and/or might be used to store and/or carry such instructions/code (e.g., as signals). In many implementations, a computer readable medium is a physical and/or tangible storage medium. Such a medium may take many forms, including but not limited to, volatile and non-volatile media. Non-volatile computer-readable media includes, for example, optical or magnetic disks, such as the storage device(s) (608 or 610). Volatile computer-readable media includes, without limitation, dynamic memory, such as the working memory 618. In some implementation, data may be carried over transmission media. Transmission media includes coaxial cables, copper wire, and fiber optics, including the wires that comprise the bus 626, as well as the various components of the communication subsystem 614 (and/or the media by which the communications subsystem 614 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 602 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 600. These signals, which might be in the form of electromagnetic signals, acoustic signals, optical signals, and/or the like, are all examples of carrier waves on which instructions can be encoded, in accordance with various embodiments of the invention.

The communications subsystem 614 (and/or components thereof) generally will receive the signals, and the bus 626 then might carry the signals (and/or the data, instructions, etc. carried by the signals) to the working memory 618, from which the processor(s) 602 retrieves and executes the instructions. The instructions received by the working memory 618 may optionally be stored on a storage device 608 either before or after execution by the processor(s) 602.

It will be appreciated that many processing capabilities in addition to those described are possible, without departing from the teachings according to the invention. Further, it should be noted that the methods, systems, and devices discussed above are intended merely to be examples. Various embodiments may omit, substitute, or add various procedures or components as appropriate. For example, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Further, the headings provided herein are intended merely to aid in the clarity of the descriptions of various embodiments, and should not be construed as limiting the scope of the invention or the functionality of any part of the invention. For example, certain methods or components may be implemented as part of other methods or components, even though they are described under different headings.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Problems Solved in the Present Invention and Not Addressed in the Prior Art:

1. An offline system comprised of 3 or more computing devices that are orchestrated via software to share storage and compute capacity in support of the batch processing of data.
2. The separation of the offline system in 1 from the public internet for the purpose of protecting the security and privacy of the data stored in that system.
3. An online system comprised of 3 or more computing devices that are orchestrated via software to share storage and compute capacity in support of the online delivery of recommendations
4. The replication of one or more online systems as in 3. that are geographically distributed to reduce the request time to the system induced by network delays and to provide a measure of resilience to system failures.
5. A software system that receives data that represents the purchase, interest (e.g. a "click") or rating of content, a time stamp, and a unique identifier for the relevant user (i.e. "activity data") from a mobile computing device using HTTP
    a. The activity data may arrive as either stream of data from one or more mobile devices or as a bulk transmission of data from an external database that collects activity data from other sources such as a carrier billing system.
6. The routing of activity data from the receiving systems to the offline system in 1. using a network of distributed computers configured to handle the scale of millions of users submitted activity data simultaneously.
7. A software system that receives data that represents catalogs of content (i.e. "reference data") that users may purchase or view, and on which users register interest through the activity data.
8. The routing of the reference data to the offline system in 1.
9. The distribution of recommended item lists to the systems described in 3 and 4. such that all geographically distributed replicas of 3 have the same copy of the recommendations data.
10. The receipt of requests for recommendations from mobile devices via HTTP in 3. The requests include the user's identity, device identifier, and list of other content items identifiers the user is currently viewing.
11. The processing of requests for recommendations by retrieving the list of recommended items stored generated and distributed in 9 and 10, including the application of additional activity data as it arrives in the 5.
12. The transmission of the recommendations to the mobile device via HTTP.
13. The collection of the user's disposition toward the recommendation and submission of this disposition as activity data to the system in 5.
14. The co-existence of multiple content catalogs with different item types, and cross-recommendation between the different item types.
15. The ability to group collections of content catalogs under a single entity, labeled "organization", and the ability to manage and configure batch processing and delivery of recommendations for each organization independently.
16. A configuration management system where configuration for each entity can be defined separately (in separate files, and/or stored on different media) and placed in a configuration hierarchy at a specific level and lineage.
17. The ability of the said configuration management system to seamlessly enable fallback to higher-level configuration entities to fill gaps in configuration, also enabling setting default configuration at each level of the hierarchy.
18. The ability to programmatically create at run-time nested instances of software entities that correspond to the configuration hierarchy without prior knowledge of the hierarchy's characteristics and its constituents.
19. The ability to return recommendations that are compatible with a user's specific mobile device, for example mobile games that only work on particular devices. In particular, recommendations are "modeled" in a device-specific manner, rather than simply filtering them for a particular type of device. This ensure that recommendations will be available for the greatest number of possible devices.
20. The ability to return recommendations that are in a specific content category that the user chooses, for example sports games.
21. The ability to control the distribution of content types in the recommendations returned to a user, for example always returning games and ringtones, rather than sometimes just one or the other.
22. The ability to guarantee that recommendations are always returned, by using a fallback model that attempts to return the most relevant recommendations available, but will fall back to lower quality recommendations so that something is always returned. For example, if recommendations based on item-to-item associations are not available, then try content-based recommendations, then try popular recommendations.
23. The ability to recommend content based on it's timeliness or recency.
24. The ability to ban particular items or categories of items from the recommendations, for example don't recommend adult content even if it's relevant.
25. The ability to boost particular items or categories of times in the recommendations, for example to promote a particular set of content.
26. The ability to increase the breadth of recommendations returned to the user by sampling recommendations from a larger pool where the sampling changes over time.
27. The ability to store and aggregate user activity data segmented by attributes of the user, of the content, and of the delivery channel.
28. A set of general purpose software components that are combined to compute recommendations for any set of content and user activity inputs.
29. The ability to ingest arbitrarily large content catalogs and retain only the most significant portion for the purpose of computing recommendations efficiently.
30. The ability to recognize and associate multiple mobile user identifiers with a single customer, and produce a unified customer profile.
31. The ability to recognize the properties of a mobile device based on the device's identifier, and return recommendations compatible with the device.
32. The ability to enhance content catalogs with user or machine generated descriptive tags or categories, and to build content-based recommendations from these tags or categories.
33. The ability to return different recommendations to different users based on user ID or attributes for the purposes of performing multivariate testing.
34. The ability to perform ad-hoc multivariate tests using different configurations of the recommendations models and system, and to report on the results in real time.

Problems Solved in the Present Invention that are not Addressed in the Prior Art:
1. The ability to integrate hundreds of terabytes of data to inform recommendations.
2. The protection of sensitive user activity data from intrusion and theft.
3. The ability to take into account user activity data in real-time
4. The ability to pre-compute recommendations such that responses can be served to mobile clients in 10-20 msecs
5. The ability to scale the serving of recommendations to hundreds of millions of users
6. The ability to compute recommendations according to the suitability to the device
7. Algorithmic improvements for more efficient operation
8. Recommendation diversity is taken into account.
9. The same recommendations are not returned to the user on subsequent requests.
10. The ability to change the behavior of the system significantly, including the use of various algorithms for batch processing, using the configuration management system alone.

Some of the features described above may be provided by various components of the system. For example, one feature is the ability to recognize the properties of a mobile device based on the device's identifier, and return recommendations that are compatible with a user's specific mobile device, for example mobile games that only work on particular devices. This may be provided in the system configured such that the Recs FE receives the user agent string from the mobile device in the recommendations request (Step 130 in FIG. 1) and resolves a device ID that is known to be compatible with specific items. Then only items that are compatible with the device are retrieved from the FE HBase table and returned as recommendations.

Another feature is the ability to model recommendations in a device-specific manner, rather than simply filtering them for a particular type of device. This ensure that recommendations will be available for the greatest number of possible devices. This feature may be provided in the system configured such that the Recs BE computes coefficients (weights) on items in the model uniquely for each device in the known universe of devices.

Yet another feature is the ability to scale to support a virtually unlimited number of customers, each with millions of users and separate item catalogs and user activity data, with a single recommendations system. Examples of customers could include Best Buy, Amazon, etc. This feature may be provided in the system configured such that both the Recs BE and FE store data partitioned by customer on HDFS, and models partitioned by customer in HBase. These are both scalable storage technologies. Models are computed by the Recs BE using Hadoop, which is a scalable computation platform. The Web Service API accepts a customer (i.e. organization) identifier in all requests (catalog ingestion, activity ingestion, events, and recommendations requests) which is used to either look up or store data in a customer specific partition.

Another feature is the ability to maintain the privacy, security, and protection from intrusion and theft of each customer's sensitive data. This feature may be provided in the system configured such that the Recs FE only stores raw customer data for a short period of time before it is copied to the Recs BE and deleted from the Recs FE. Long term storage of customer data is on the Recs BE, which is behind a firewall and inaccessible on the Internet.

Another feature is the ability to ingest, store, and make recommendations from multiple content catalogs, each with different item types (e.g. games, ringtones, consumer electronics, or clothing) for a single customer. This feature may be provided in the system configured such that Both the Recs BE and FE store data for each customer partitioned by item type on HDFS, and models partitioned by item type in HBase. The Recs BE includes configuration for all the known item types for each customer, such that recommendations models are built to cover all item types and all combinations of item types. The Web Service API accepts an optional list of item types in recommendations requests, so that a mobile device will receive only recommendations of a specified type.

Another feature is the ability to cross-recommend between the different item types. For example to recommend a game based on a user's interest in or rating of a ringtone. This feature may be provided in the system configured such that the Recs BE computes a model that is stored in HBase such that a source item of a particular type can recommend a target item of either the same type, or of a different type.

Another feature is the ability to take into account mobile user activity in real-time to generate recommendations. For example a user's installation of a mobile app, or rating or purchase of an item. This feature may be provided in the system configured such that the Recs FE has an Event API that receives activity data (FIG. 3 Step 1) and stores it in a special user profile table in HBase (FIG. 3 step 2) where it is immediately available to be used by the Recs FE for computing recommendations. For example, if the Event API receives an event that indicates a user just installed a particular app on their device, the recs FE can then use this information immediately to recommended items for this user that are similar to the application.

Another feature is the ability to enhance content catalogs with user or machine generated descriptive tags or categories, and to build content-based recommendations from these tags or categories. This feature may be provided in the system configured such that the Recs BE, as part of catalog ETL (FIG. 2 step 6), can be configured add descriptive tags to items based on item ID or category. These tags are then incorporated into the model building process (also FIG. 2 step 6) for content-based recommendations models.

The present invention has been described above in terms of a presently preferred embodiments so that an understanding of the present invention can be conveyed. There are, however, many configurations for providing user interface processing not specifically described herein but with which the present invention is applicable. The present invention should therefore not be seen as limited to the particular embodiments described herein, but rather, it should be understood that the present invention has wide applicability with respect to user interface processing generally. All modifications, variations, or equivalent arrangements and implementations that are within the scope of the attached claims should therefore be considered within the scope of the invention.

What is claimed is:

1. A non-transitory computer-readable storage medium carrying one or more sequences of one or more instructions stored thereon executed by a processor to perform a method of processing communications with at least one end user mobile device over a computer communications network, the method comprising:
receiving user activity data at a front end data center of a recommendations system sent over the network from a virtual network storefront accessed by the at least one end user mobile device, or from a mobile application on the at least one end user mobile device, wherein the user activity data comprises of log files of user clicks and online purchases;
updating an ingestion queue table storage based on the received user activity data;
receiving a polling query at the ingestion queue table storage, wherein the polling query is by a back end processing component that is behind a firewall that inhibits unauthorized communications from the network, and wherein the polling query by the back end processing component determines if there are any new entries of the user activity data in the ingestion queue that were added since a previous polling occurred;
at a time the polling query indicates new entries of the user activity data in the ingestion queue, copying the new entries of the user activity data from the ingestion queue table storage located in a front end processing component of the front end data center to a file storage of the back end processing component in response to the polling query;
deleting the new entries of the user activity data from the ingestion queue table storage after the copying the new entries of the user activity data, wherein the back end processing component stores a recommendation model in a memory storage, and the back end processing component updates the recommendation model for the at least one end user mobile device based on the sent new entries of the user activity data;
receiving, at the back end component, the updated recommendation model;
storing, at the back end component, the updated recommendation model in a database, wherein the database and the memory storage comprise a database system; and
generating a recommendation for the at least one end user mobile device based on the updated recommendation model in response to a recommendation request from the at least one end user mobile device or the virtual network storefront.

2. The non-transitory computer-readable storage medium as in claim 1, wherein the recommendation request includes a user agent string of the end user mobile device and resolves a device ID that indicates items in the database with which the end user mobile device is compatible.

3. The non-transitory computer-readable storage medium as in claim 2, wherein the back end processing component computes coefficients for the compatible items in accordance with the recommendations model and the end user mobile device.

4. The non-transitory computer-readable storage medium as in claim 2, wherein the method further comprises determining a customer identifier that is contained in each received user activity data, received catalog data, and each recommendation request, such that the customer identifier determines a customer specific partition of data in the database system, regardless of a size of the database system.

5. The non-transitory computer-readable storage medium as in claim 2, wherein the recommendation model is computed such that a database item having a predetermined item type determines a target item in the database system in accordance with the recommendation request as having either the same item type or a different item type.

6. The non-transitory computer-readable storage medium as in claim 2, wherein the database system includes at least one user profile table and wherein the user activity data is stored into the user profile table for immediate use in generating the recommendation.

7. The non-transitory computer-readable storage medium as in claim 2, wherein one or more descriptive tags are added to data for items in the database system such that the tags may be utilized by the database system to generate the recommendation model.

8. A method of processing communications with at least one end user mobile device over a computer communications network, the method comprising:
receiving, by a front end data center comprising of one or more storage devices and one or more processors of a recommendation system, user activity data sent over the network from a virtual network storefront accessed by the at least one end user mobile device, or from a mobile application on the at least one end user mobile device, wherein the user activity data comprises of log files of user clicks and online purchases;
updating, by the one or more processors of the recommendations system, an ingestion queue table storage based on the received user activity data;
receiving, by a back end processing component comprising of the one or more processors of the recommendation system, a polling query at the ingestion queue table storage, wherein the back end processing component is behind a firewall that inhibits unauthorized communications from the network;

determining, by the back end processing component, new entries of the user activity data in the ingestion queue table storage have been added since a previous polling;

in response to the determining, copying, by the one or more processors of the recommendations system, the new entries of the user activity data from the ingestion queue table storage of a front end processing component of the front end data center to a file storage of the back end processing component;

deleting the new entries of the user activity data from the ingestion queue table storage after the copying the new entries of the user activity data, wherein the back end processing component stores a recommendation model in a memory storage, and the back end processing component updates the recommendation model for the at least one end user mobile device based on the sent new entries of the user activity data;

receiving, by the back end component, the updated recommendation model;

storing, by the back end component, the updated recommendation model in a database, wherein the database and the memory storage comprise a database system; and generating, by the one or more processors of the recommendations system, a recommendation for the at least one end user mobile device based on the updated recommendation model in response to a recommendation request from the at least one end user mobile device or the virtual network storefront.

9. The method as in claim 8, wherein the recommendation request includes a user agent string of the end user mobile device and resolves a device ID that indicates items in the database with which the end user mobile device is compatible.

10. The method as in claim 9, wherein the back end processing component computes coefficients for the compatible items in accordance with the updated recommendation model and the end user mobile device.

11. The method as in claim 9, wherein the method further determines a customer identifier that is contained in each received user activity data, received catalog data, and each recommendation request, such that the customer identifier determines a customer specific partition of data in the database, regardless of a size of the database system.

12. The method as in claim 9, wherein the recommendation model is computed such that a database item having a predetermined item type determines a target item in the database system in accordance with the recommendation request as having either the same item type or a different item type.

13. The method as in claim 9, wherein the database system includes at least one user profile table and wherein the user activity data is stored into the user profile table for immediate use in generating the recommendation.

14. The method as in claim 9, wherein one or more descriptive tags are added to data for items in the database system such that the tags may be utilized by the database system to generate the recommendation model.

* * * * *